US006305642B1

United States Patent
Johnson (10) Patent No.: US 6,305,642 B1
(45) Date of Patent: Oct. 23, 2001

(54) GLIDER LAUNCHING DEVICE

(76) Inventor: Nelson P. Johnson, 1100 York Castle Dr., Pflugerville, TX (US) 78660

(*) Notice: Subject to any disclaimer, the term of this patent is extended or adjusted under 35 U.S.C. 154(b) by 0 days.

(21) Appl. No.: 09/649,649

(22) Filed: Aug. 29, 2000

(51) Int. Cl.$^7$ ............................... B64F 1/04; A63H 27/14
(52) U.S. Cl. ............................ 244/63; 446/63; 446/64
(58) Field of Search .................. 244/63, 904, 155 R; 446/34, 59, 61, 63, 64, 65

(56) References Cited

U.S. PATENT DOCUMENTS

| 1,572,270 | 2/1926 | Dwyer | 46/81 |
|---|---|---|---|
| 1,879,986 | 9/1932 | Macklin | 46/81 |
| 2,158,377 | 5/1939 | O'Hare | 46/81 |
| 2,644,271 | 7/1953 | Shapiro | 46/81 |
| 2,804,619 | * 8/1957 | Holt | 446/60 |
| 4,064,647 | * 12/1977 | Lemelson | 46/81 |
| 4,168,815 | * 9/1979 | Hodde et al | 244/155 R |
| 4,238,093 | * 12/1980 | Siegel et al. | 244/63 |
| 4,308,849 | * 1/1982 | Seregely | 124/5 |
| 5,129,852 | * 7/1992 | Crisci et al. | 446/60 |
| 5,395,275 | * 3/1995 | Johnson | 446/60 |

* cited by examiner

Primary Examiner—J. Woodrow Eldred
(74) Attorney, Agent, or Firm—Jackson Walker L.L.P.; Richard R. Ruble (57) ABSTRACT

A device for launching a flying structure having a nose end and a tail end, having a cradle member having a first and a second end, a nose engagement member having a first and second end, a tail engagement member, and means for propelling the flying structure. The cradle member retains the flying structure prior to its launch. The second end of the nose engagement member is pivotably attached to the first end of the cradle member. The nose engagement member releasably engages the nose of the flying structure prior to launch. The tail engagement member releasably engages the tail of the flying structure prior to launch and is attached to the second end of the cradle member. When the means for propelling the flying structure is an elastic cord, the cord is attached to both the first end of the nose engagement member and to a stationary object such that the cord supplies motive force to propel the flying structure after the cord is stretched. When the cradle member is released, the nose engagement member pivotably disengages from the nose of the flying structure and the tail engagement member disengages from the tail of the flying structure such that the launcher falls to the ground as the flying structure continues in flight.

9 Claims, 12 Drawing Sheets

GLIDER LAUNCHING DEVICE

BACKGROUND OF THE INVENTION

The present invention relates to a device for launching a flying structure and more particularly to a glider launcher having a pivoting joint which allows the launcher to attach to the glider during launch and release from the glider subsequent to launch.

Adults and children alike have been fascinated by flying objects such as airplanes and gliders. Flying gliders are well known in the art and have been made of a variety of materials such as paper, cardboard, balsa wood, plastic, and Styrofoam. Gliders have generally had a body section, a nose, wings, and a tail structure. The tail structure of a glider often includes one or more fins or rudders and a gripping area to be used to hold the glider as it is launched into flight.

While no doubt initial gliders were launched by being manually thrown or dropped from some high position, various types of launchers have been developed. Perhaps the most pervasive type of glider launcher is the use of an elongated elastic cord or spring tied to some stationary object. This involves drawing the glider rearwardly away from the stationary object such that compression force is generated within the elastic cord or spring. When the glider is released the engagement of the elastic cord or spring propels the glider forwardly with sufficient speed to launch its flight.

A stick with a rubber band connected to one end has also been used to launch flying gliders. The stick is held in one hand and is raised upwardly, the elastic cord is connected to a hook on the glider and the tail section of the glider is grasped and pulled to stretch the cord. When the tail section is released the compression force stored in the cord propels the glider into flight. This technique often results in the glider colliding with the stick or colliding with the hand of the operator holding the stick, causing the launch to be unsuccessful.

U.S. Pat. No. 1,572,270 sets forth an airplane having an attachment member extending from the undersurface of the airplane body. The attachment member having a hook and clasp attached at its end for receiving an elastic cord. The elastic cord slides off of the hook once the cord is slackened subsequent to launch. This design requires a cumbersome landing member to be permanently attached to the airplane.

U.S. Pat. No. 4,060,930 sets forth an airplane launcher having a launch platform for supporting two airplanes each of which include a member extending downwardly from the body of the plane to receive the elastic cord. The platform includes an apparatus for restraining the airplane in a cocked position after the airplane is drawn against the resilient force of the elastic cord. A trigger mechanism releases the airplane and launches it in a manner resembling the catapult of an aircraft carrier. This design requires a landing member to be permanently attached to the airplane.

U.S. Pat. No. 4,863,412 sets forth a glider having an outwardly extending member built into the undersurface of the glider which receives an elastic cord. This member is shaped to engage the cord in the rearward direction and release it in the forward direction. The elastic cord is supported by a fork-like handle similar to a sling shot. This design requires a landing member to be permanently attached to the airplane.

Flying structures without a power source must be lightweight in order to fly. Each launching technique mentioned above requires the body of the flying structure itself to be altered with additional components for engaging the elastic cord. This addition to the body of the airplane or glider increases the weight of the structure and causes a reduction in speed as well as potential flying distance. These additional components also detract from the aesthetic appearance of the flying structure.

A prior art launching design that seeks to avoid the attachment of additional components to the flying structure is the simple drilling of a hole into the nose of the flying structure. An elastic cord is then attached to the flying structure using a hook. The elastic cord is then placed under tension as described above to launch the flying structure.

When the elastic cord is attached directly to the flying structure, the body of the flying structure is placed under stress during a launch. The physical integrity of the airplane or glider is weakened during every launch. Various types of flying structures are not capable of withstanding these forces placed upon them during launch. For example, a Styrofoam glider requires a plywood attachment to its undersurface in order to be launched in such a manner. The addition of plywood to the body of the Styrofoam glider reduces the flight characteristics of the glider and results in an unaesthetic view of the glider.

The present invention provides for a compact and easy to use launcher that efficiently launches a flying structure without any modification to the flying structure being launched.

SUMMARY OF THE INVENTION

Accordingly, the present invention provides an apparatus and a method for launching a flying structure having a pivoting joint which allows for attachment of the device to the nose and tail of the flying structure before a launch and release of the device from the flying structure after a launch. The present invention provides for quick and efficient launching of a flying structure without modification of the flying structure.

The present invention has a cradle member for retaining the flying structure prior to launch, a nose engagement member pivotably attached to a first end of the cradle member and releaseably engaging the nose of the flying structure prior to a launch, and a tail engagement member attached to a second end of the cradle member and releaseably engaging the tail of the flying structure prior to a launch.

When an elastic cord is used to propel the flying structure, a first end of the cord is attached to the nose engagement member and a second end is attached to a stationary object. The cradle member of the launcher is then stretched away from the stationary object and released by the operator such that the flying device and the launcher are propelled in the launching direction. The nose engagement member pivots in a downward direction as the elastic cord slackens. The nose engagement member pivotably disengages the nose of the flying structure causing the tail engagement member to disengage the tail of the flying structure. The launcher then falls harmlessly to the ground as the flying structure continues to fly.

DETAILED DESCRIPTION OF THE PREFERRED EMBODIMENT

The present invention, as illustrated in the Figures, is herein described as a device for launching a flying structure (50), a combination flying structure (50) and launcher (10), and as a method of launching a flying structure (50). Examples of flying structures with which the present invention may be used include model airplanes, gliders, or any other projectile capable of flight. These flying structures (50) typically having a nose end (50A) and a tail end (50B). Flying structures (50) are generally composed of a lightweight material such as balsa wood, Styrofoam, or cardboard.

Referring to FIGS. 1–4, the launcher (10) may be composed of metal wire, composite material, wood, or any substantially rigid material capable of supporting the flying structure (50) during a launch. The physical dimensions of the launcher (10) may be altered to allow easy attachment to any type of flying structure (50). The present invention allows the flying structure (50) to be launched without the use of a motor and without undue stress being placed upon the flying structure (50) itself.

Referring to FIGS. 1–4, the launcher (10) has a cradle member (12) which supports and retains the flying structure (50) having a first end (12A) and a second end (12B), a nose engagement member (14), a tail engagement member (16), and a propelling member (18) for imparting energy to the flying structure (50). The nose engagement member (14) is pivotably attached to the first end (12A) of the cradle member (12) and the tail engagement member (16) is attached to the second end (12B) of the cradle member (12).

Figure 1:
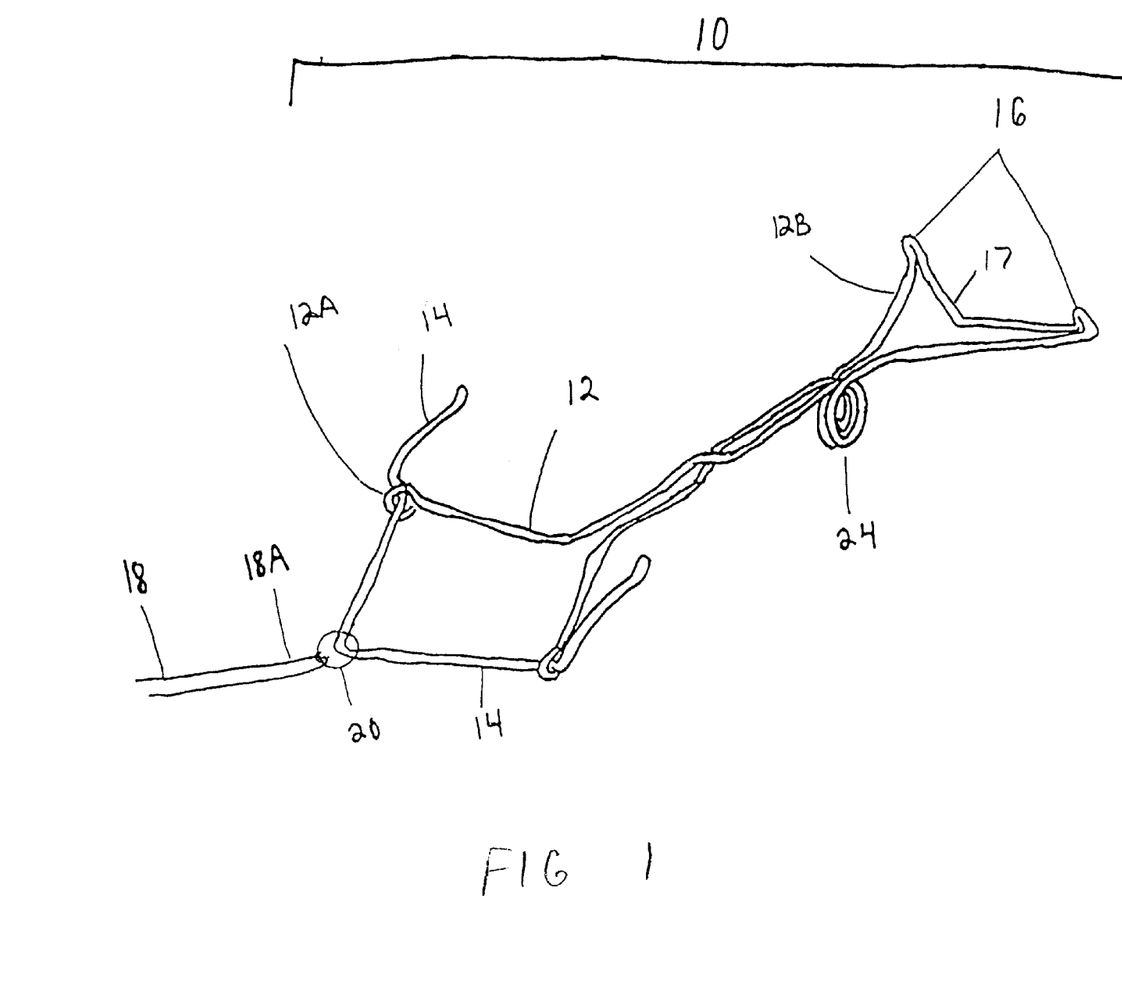
FIG. 1 is a top, left, front perspective view of the preferred embodiment of the present invention composed of metal wire illustrating its attachment to an elastic cord.
Figure 2:
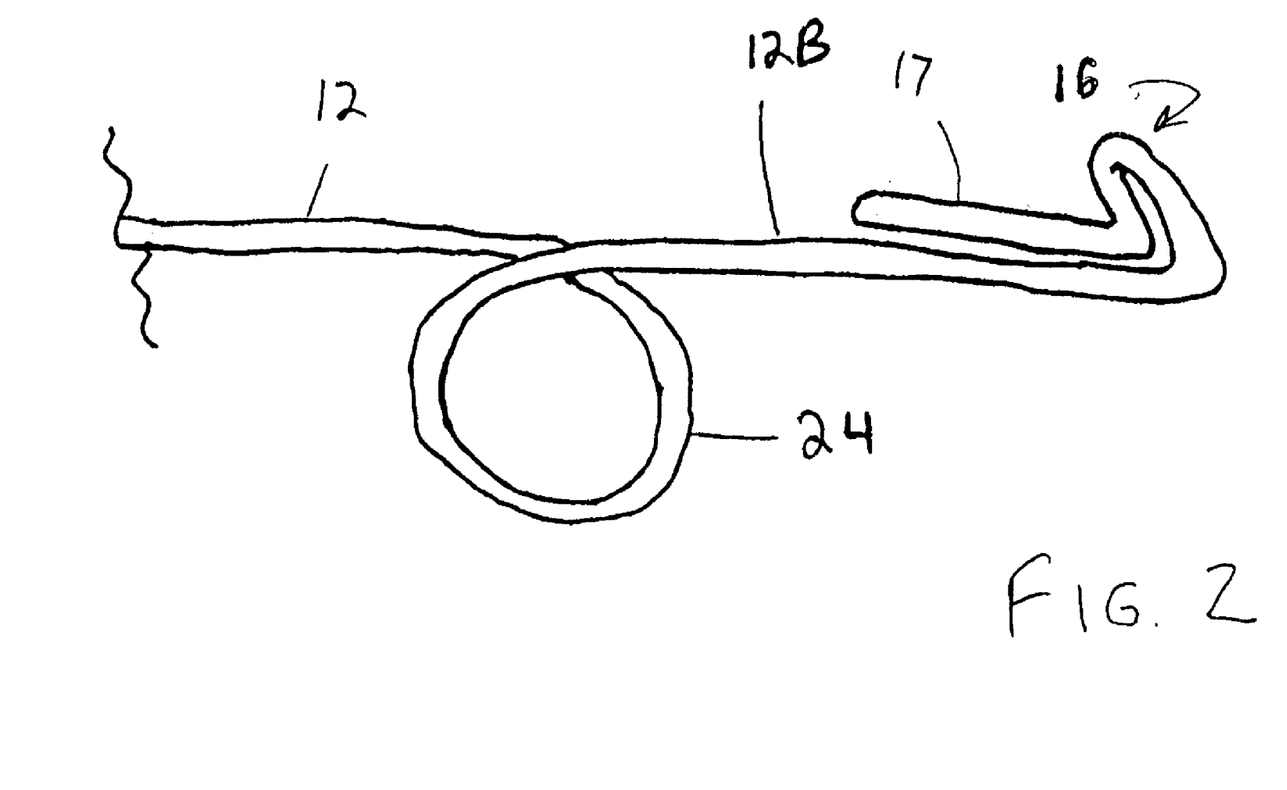
FIG. 2 is a, partial side elevation view of the rear section of the preferred embodiment of the present invention composed of metal wire illustrating the tail engagement member and the finger hold.
Figure 3:
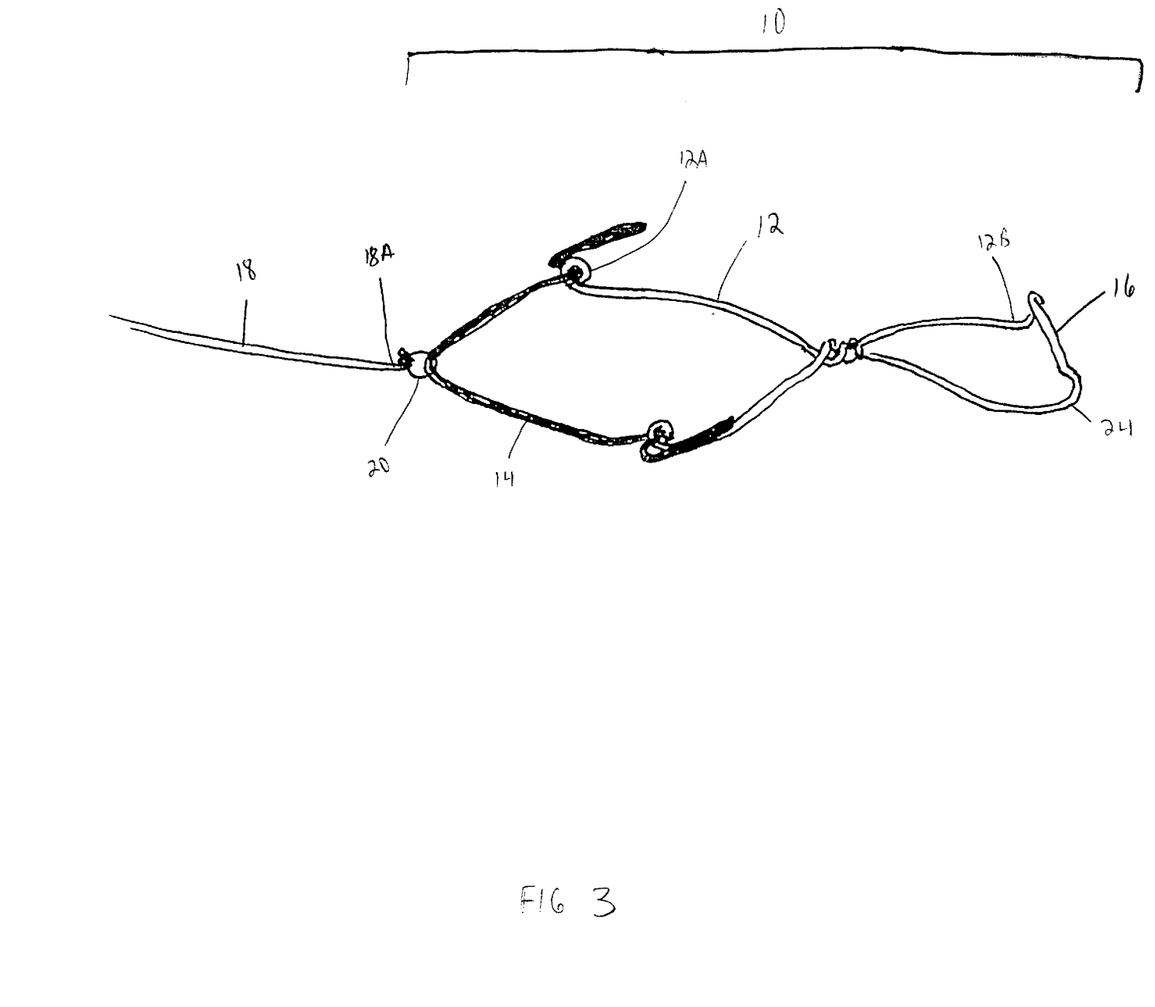
FIG. 3 is a top, left, front perspective view of another embodiment of the present invention composed of metal wire illustrating its attachment to an elastic cord.
Figure 4:
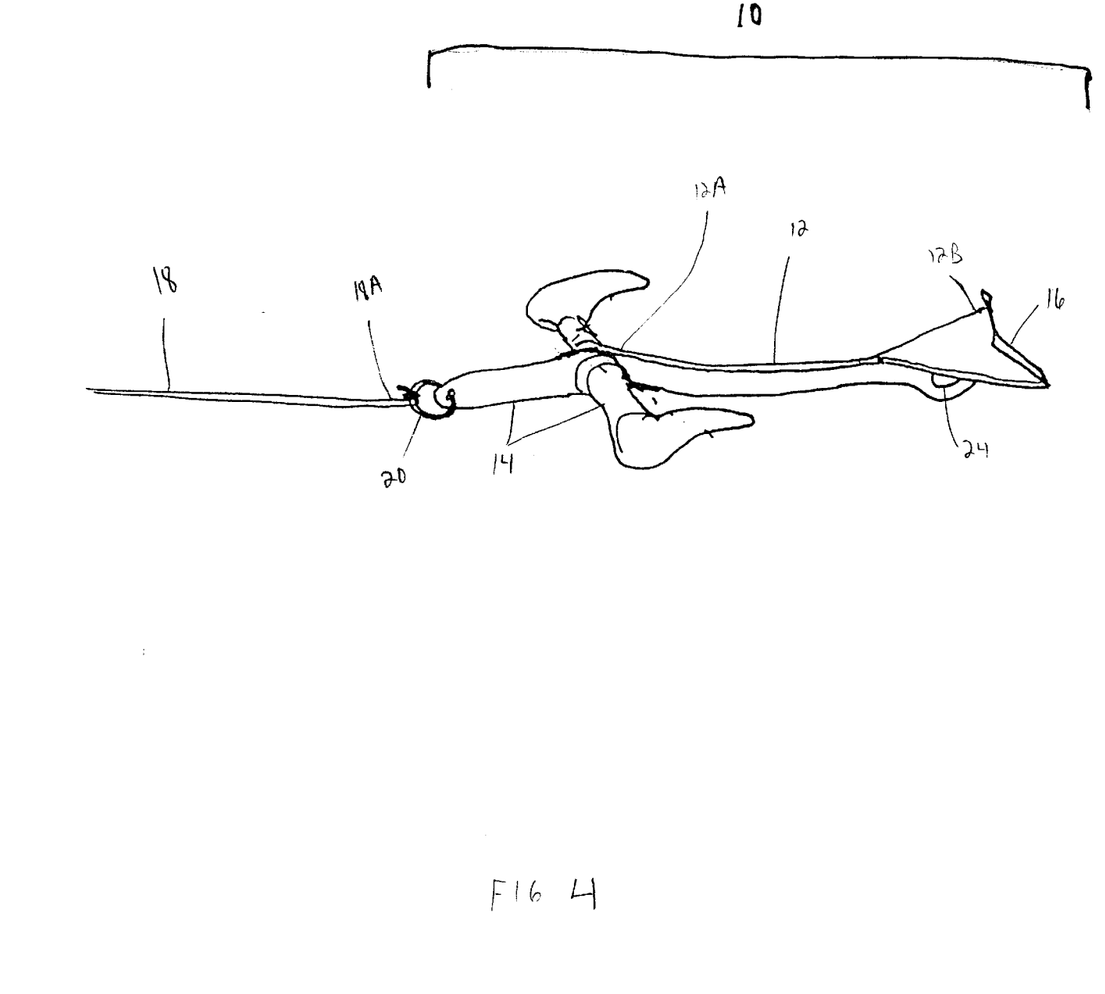
FIG. 4 is a top, left, front perspective view of the present invention composed of composite material.
Figure 5:
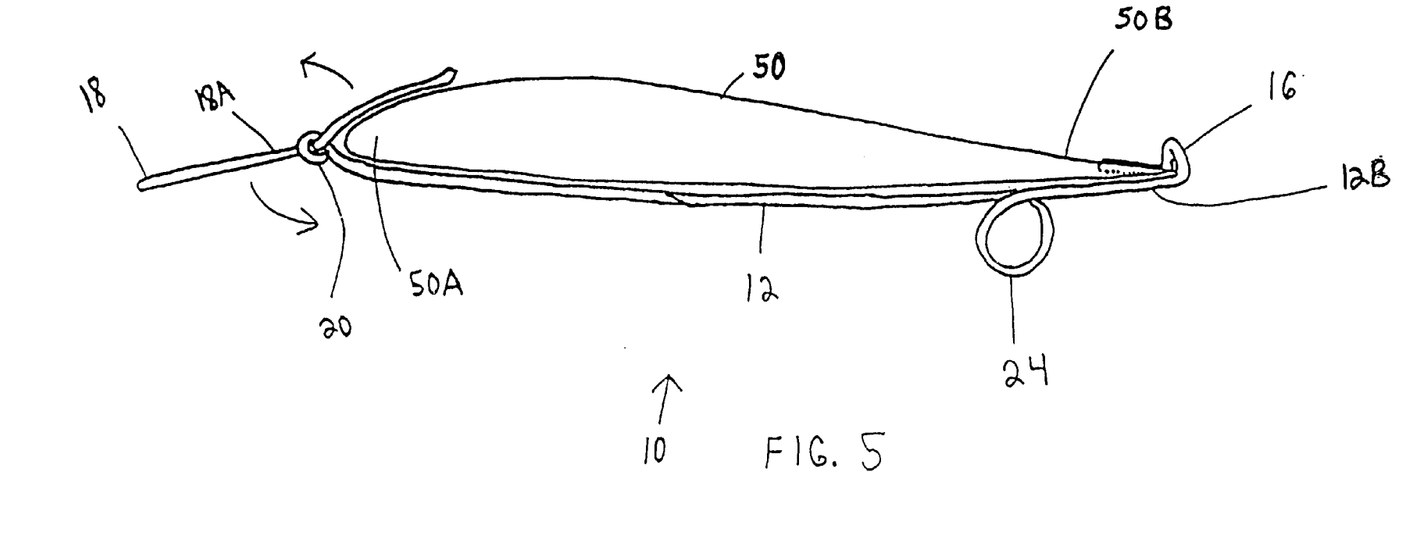
FIG. 5 is a side elevation view of the preferred embodiment of the present invention composed of metal wire illustrating its engagement with the nose end and the tail end of a flying structure.
Figure 6:
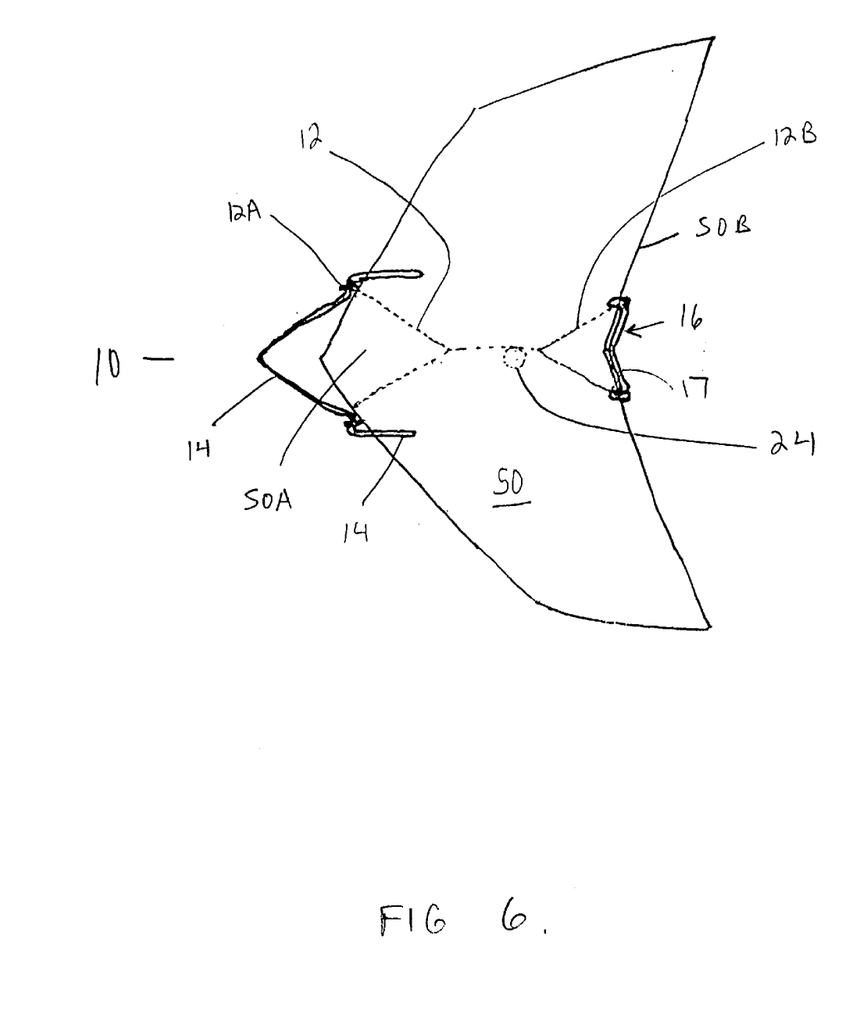
FIG. 6 is a top plan view of the preferred embodiment of the present invention showing the nose engagement member and the tail engagement member engaging the flying structure.
Figure 7:
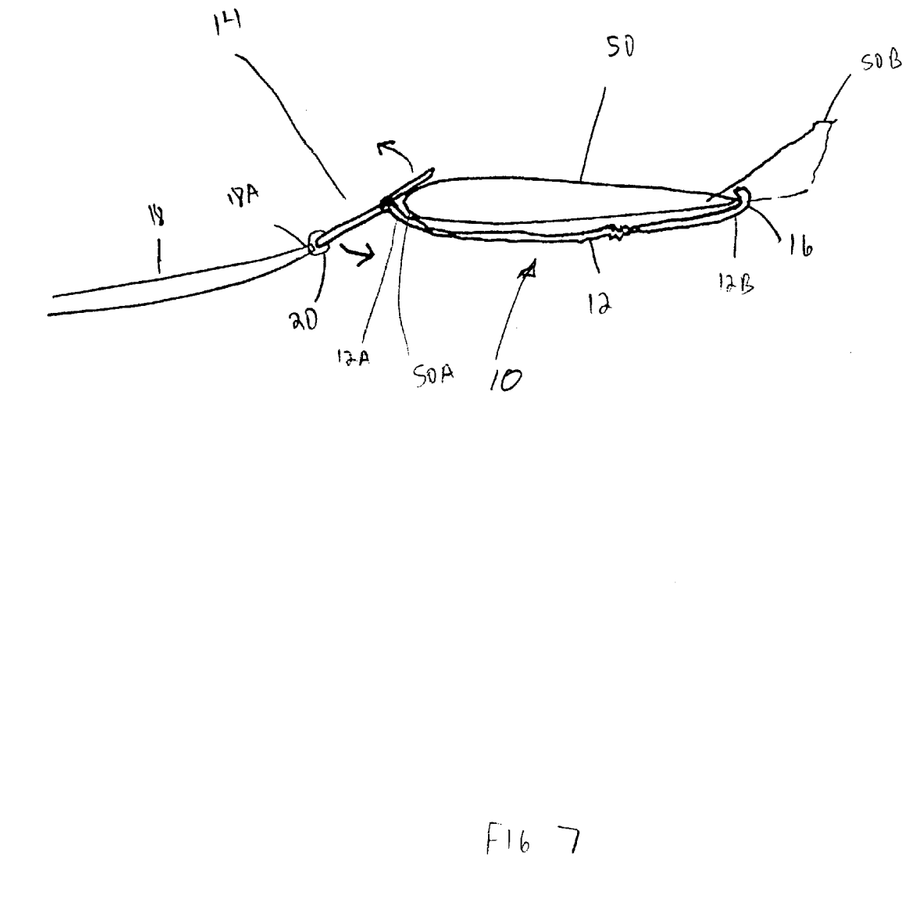
FIG. 7 is a side elevation view of another embodiment of the present invention composed of metal wire illustrating its engagement with the nose end and the tail end of a flying structure.
Figure 8:
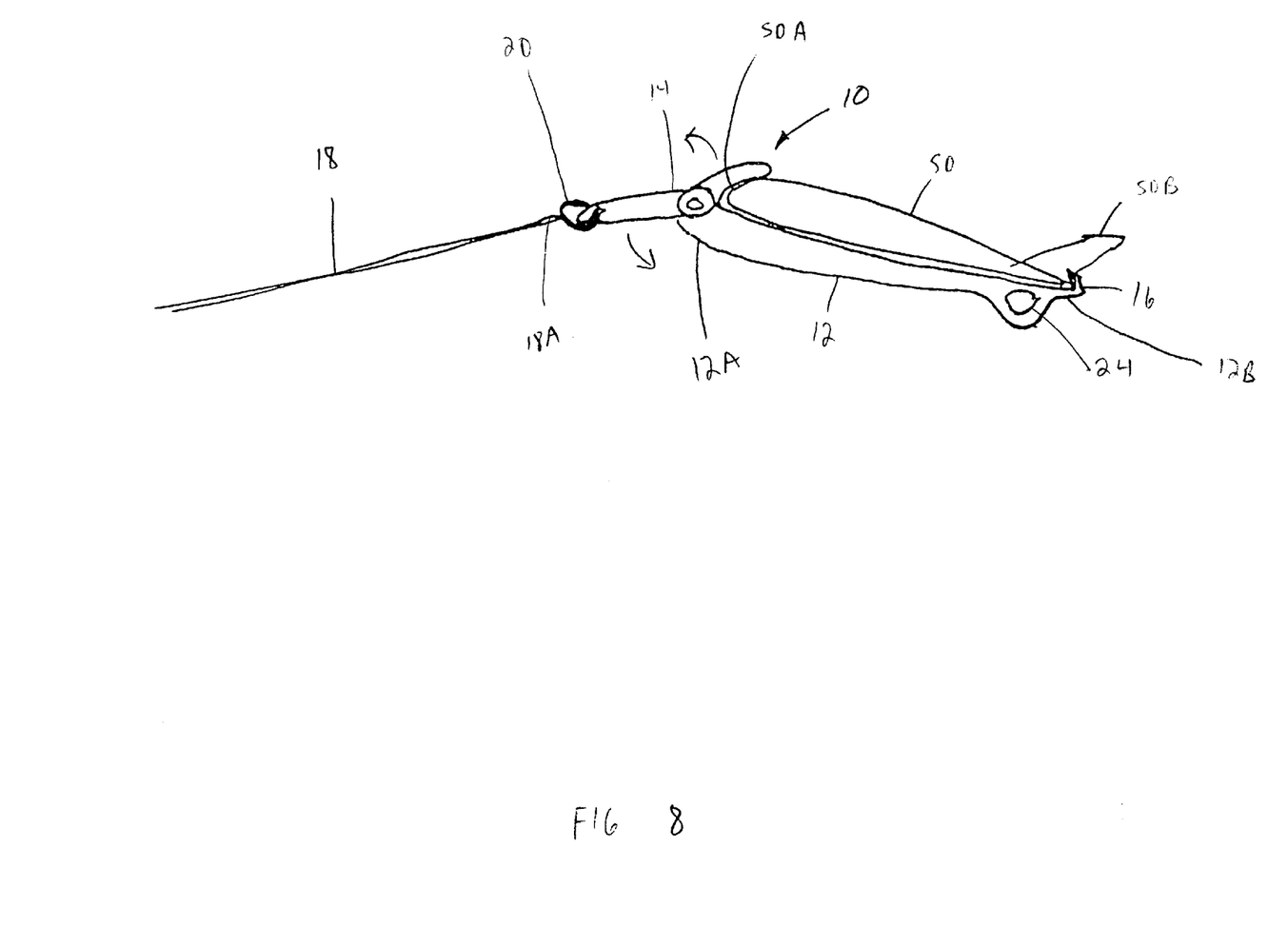
FIG. 8 is a side elevation view of the present invention composed of composite material illustrating its engagement with the nose end and the tail end of the flying structure and its attachment to an elastic cord.

Referring to FIGS. 5–8, prior to launch of the flying structure (50), the nose engagement member (14) releasably engages the nose (50A) of the flying structure (50) and the tail engagement member (16) releasably engages the tail (50B) of the flying structure (50). The tail engagement member (16) is adapted to securely attach to the tail (50B) of the flying structure (50) yet allow easy detachment without contacting the flying structure (50) during the disengagement process described below. As illustrated in FIGS. 1, 2, and 5, the tail engagement member (16) of the preferred embodiment extends upwardly and at an angle from the perpendicular in the direction of the nose engagement member (14) to receive the tail (50B) of the flying structure (50). Referring to FIG. 6, the tail engagement member (16) of the preferred embodiment has a lateral force distribution member (17) designed such that it has a V shape. The V shape of the preferred embodiment distributes the force encountered during a launch along the surface area of the tail (50B) of the flying structure (50), as illustrated in FIG. 6. This force distribution is especially important given that the tail (50B) is often the thinnest and weakest portion of the flying structure (50) and launch forces are preferably distributed over an extended area of the tail. Where the tail section (50B) is generally straight, the force distribution member (17) is shaped to fit against the straight contour of the tail (50B). The present invention allows for secure attachment of the launcher (10) to the flying structure (50) without the need for the attachment of additional components to the flying structure itself.

Referring to the Figures, the propelling member (18) for imparting energy to the flying structure (50) of the preferred embodiment of the present invention is an elastic cord (18) attached at a first end (18A) to the nose engagement member (14). The elastic cord (18) is typically attached to the nose engagement member (14) using a hook (20). Referring to FIGS. 9–12, the second end of the elastic cord (18) is attached to any stationary object (22) such as a post secured to the ground (26). The elastic cord (18) provides motive force to propel the flying structure (SO) after the cord (18) is stretched away from the stationary object (22) and released. Any resilient spring-like apparatus or hydraulic/pneumonic mechanism may be utilized to propel the flying structure (50) and the launcher (10).

Figure 9:
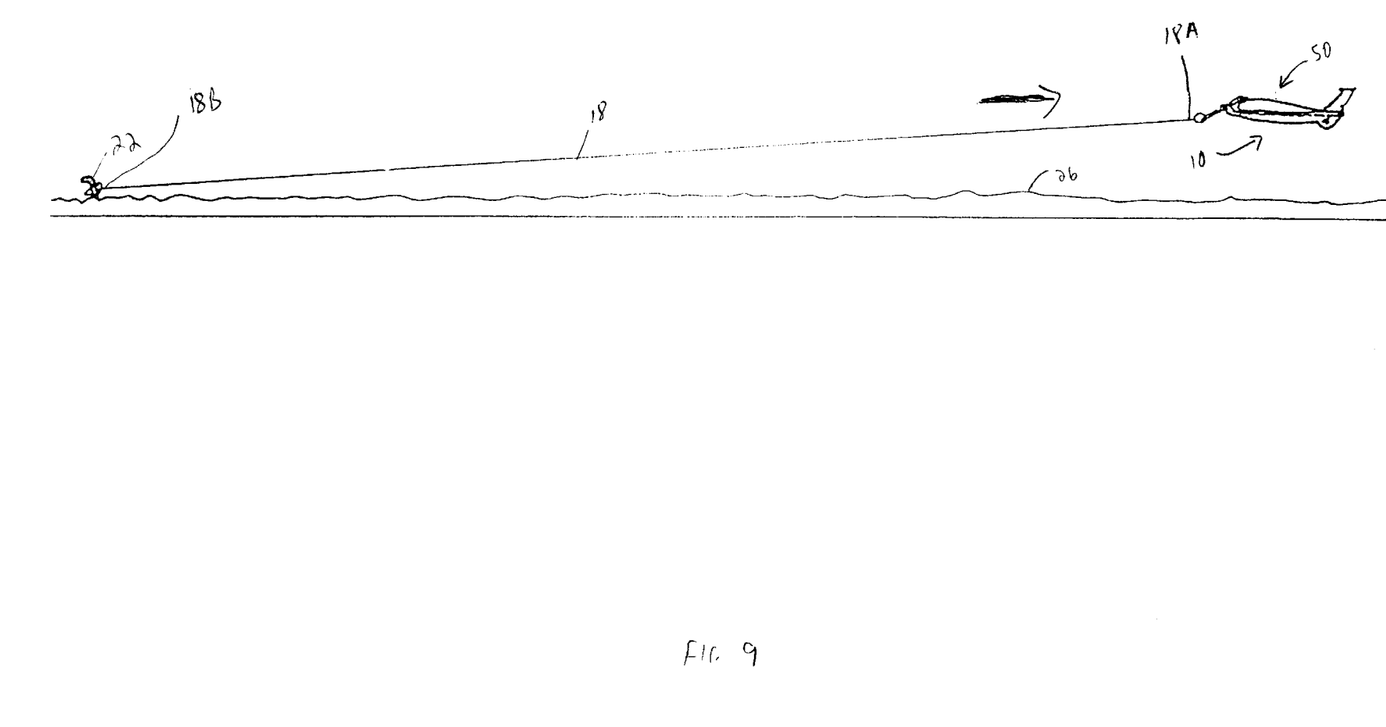
FIG. 9 is a side elevation view of the present invention illustrating its attachment to the nose end and tail end of the flying structure, its attachment to an elastic cord, and the elastic cord under tension between the present invention and a stationary object before launching.

The operator grasps means for gripping the cradle member (12) of the launcher (10) and stretches the elastic cord (18) away from the stationary object (22), as illustrated in FIG. 9. This movement builds up motive force within the elastic cord (18) such that when the cradle member (12) is released by the operator, the elastic cord (18) propels the launcher (10) and the flying structure (50) toward the stationary object (22), as illustrated in FIGS. 10–12.

Referring back to FIGS. 1–6, the present invention has means for gripping the cradle member (12) to allow convenient movement of the launcher (10) by the operator. The cradle member of the present invention is shaped to provide one or more finger holds (24) that the operator may grasp when stretching the cradle member (12) away from the stationary object (22) during a launch.

The operator grasps the cradle member (12) of the launcher (10) and not the flying structure (50) during the launching procedure. Accordingly, the present invention spares the flying structure (50) from structural damage caused by stress encountered during the stretching of the elastic cord (18). The launcher (10) of the present invention spares the flying structure from structural damage by enduring this stress.

Figure 10:
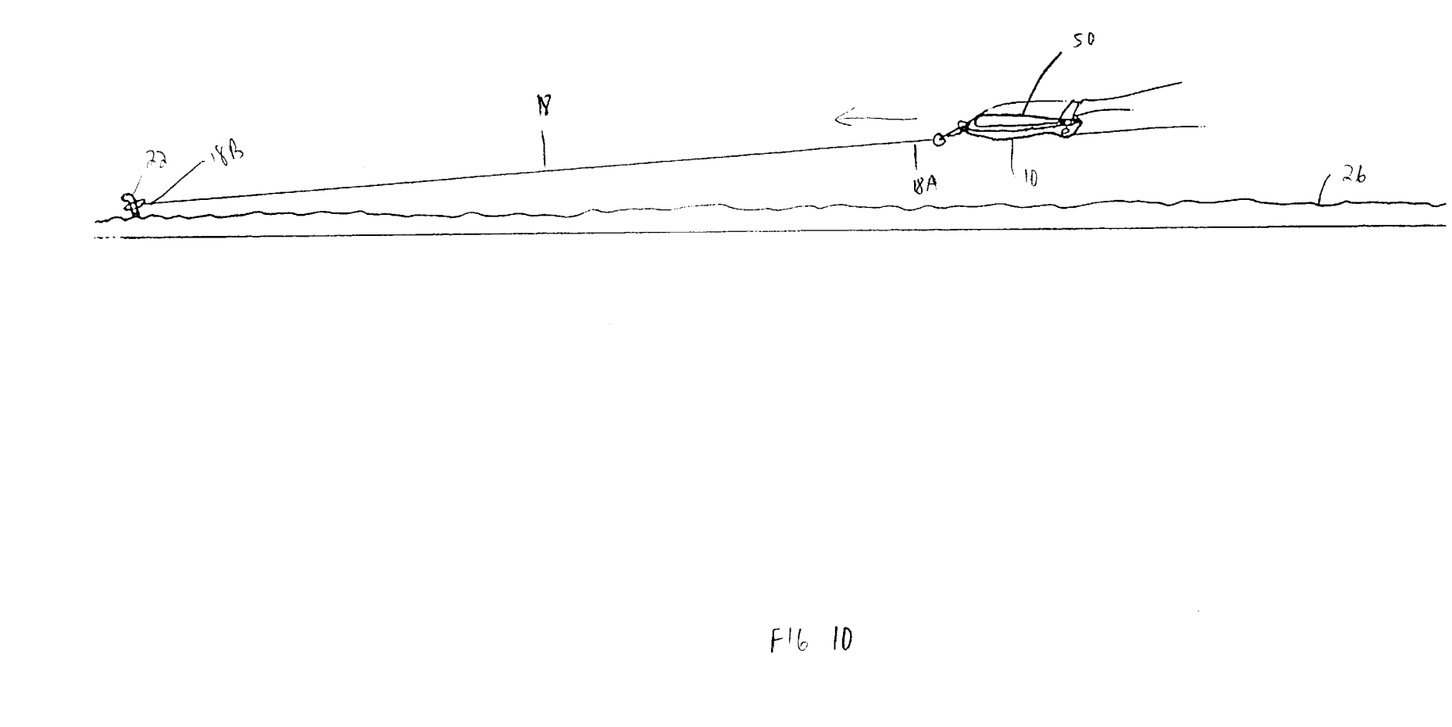
FIG. 10 is a side elevation view of the present invention illustrating its attachment to the nose end and tail end of the flying structure, its attachment to an elastic cord, and the elastic cord under tension between the present invention and a stationary object immediately after release of the cradle member by the operator.
Figure 11:
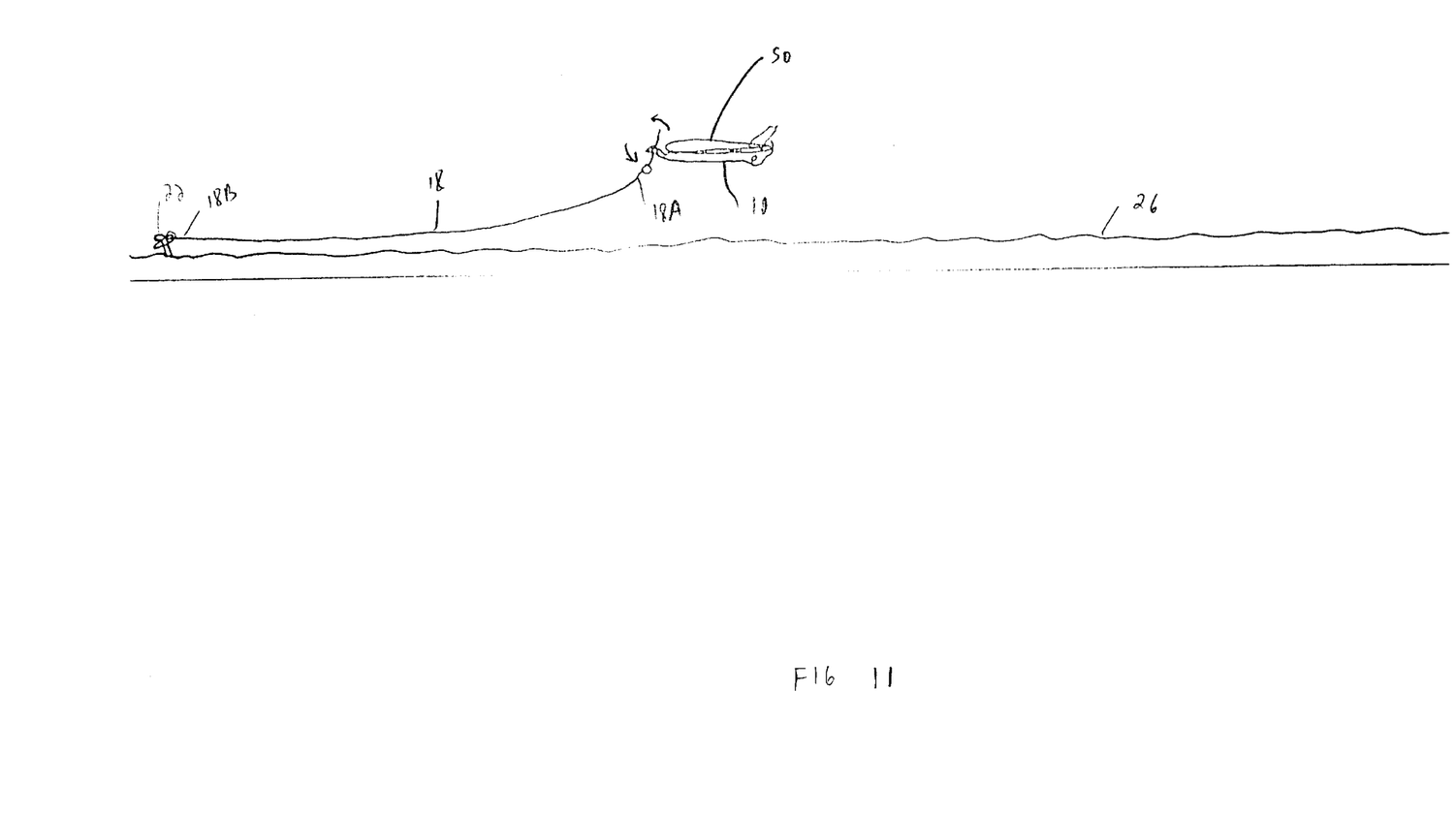
FIG. 11 is a side elevation view of the present invention illustrating the nose engagement member pivoting downwardly and disengaging from the nose end of the flying structure when the elastic cord has slackened.
Figure 12:
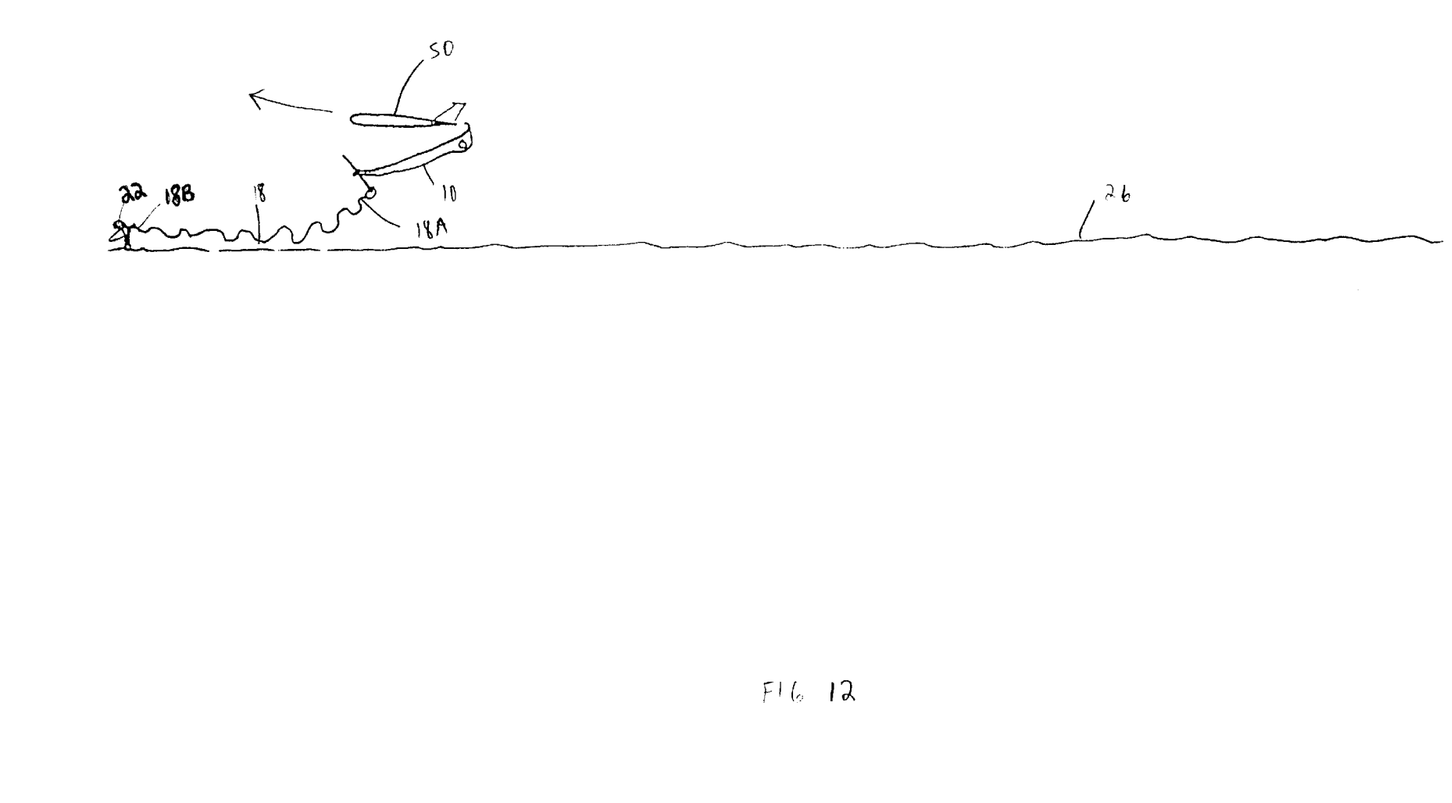
FIG. 12 is a side elevation view of the present invention illustrating the tail engagement member disengaging from the tail end of the flying structure.

When the operator releases the finger hold (24) of the cradle member (12) after the elastic cord (18) is stretched, the motive force of the elastic cord (18) is imparted to and propels the flying structure (50) along with the launcher (10) in the direction of the stationary object (22), as illustrated in FIGS. 10–12. The elastic cord (18) will slacken as the flying structure (50) and the launcher (10) approach the stationary object (22), as illustrated in FIGS. 11 and 12.

Referring to FIGS. 11 and 12, as the launcher (10) approaches the stationary object (22), with the slackened cord (18), the cord (18) falls downwardly and the weight of the cord downwardly pulls upon the nose engagement member (14) such that the nose engagement member pivotably disengages from the nose (50A) of the flying structure (50). After pivotably disengaging from the nose (50A) of the flying structure (50), the nose engagement member (14) of the present invention begins to fall toward the ground (26). The nose engagement member (14) is pivotably attached to the cradle member (12) such that the downward movement of the nose engagement member (14) allows the tail engagement member (16) to disengage from the tail (50B) of the flying structure (50) because of the increased drag of the nose engagement member (14) caused by its downwardly pivoted orientation.

The disengagement of the nose engagement member (14) and the tail engagement member (16) results in complete detachment of the launcher (10) from the flying structure (50), as illustrated in FIG. 12. The nose engagement member (14) is attached to the first end (18A) of the elastic cord (18) such that the weight of the cord and the drag upon the nose engagement member (14) gently pulls the entire launcher (10) toward the ground (26) after a launch. The flying structure (50) proceeds upwardly and forwardly through the air after detachment of the launcher (10).

The present invention allows the flying structure (50) to be launched without additional parts and without modification. By attaching the elastic cord (18) to the launcher (10) and not to the flying structure, the present invention eliminates the need to drill holes into the flying structure and eliminates the need for additional parts, such as seen in the prior art, to be attached to the flying structure (50). The flight characteristics of the flying structure (50) are improved in that no additional weight or wind resistance is caused by modifications to the flying structure.

The present invention may also be described as a combination flying structure (50) and launcher (10). The flying structure (50) having a nose (50A) and a tail end (50B). The combination has a cradle member (12) which retains the flying structure (50) having a first end (12A) and a second end (12B), a nose engagement member (14), a tail engagement member (16), and means for propelling the flying structure (50).

The nose engagement member (14) is pivotably attached to the first end (12A) of the cradle member (12) and the tail engagement member (16) is attached to the second end (12B) of the cradle member (12). Prior to launch of the flying structure (50), the nose engagement member (14) releasably engages the nose (50A) of the flying structure (50) and the tail engagement member (16) releasably engages the tail (50B) of the flying structure (50).

To launch the flying structure (50) using the present invention, an operator need only follow a few simple steps. First, attach a first end (18A) of the elastic cord (18) to the nose engagement member (14). Second, attach a second end (18B) of the elastic cord (18) to a stationary object (22). Third, place the flying structure (50) upon the cradle member (12) of the launcher (10) so that the nose (50A) of the flying structure (50) engages the nose engagement member (14) and the tail (50B) of the flying structure (50) engages the tail engagement member (16).

Fourth, pull the cradle member (12) of the launcher (10) away from the stationary object (22) such that the elastic cord (18) is placed under tension and the nose (50A) of the flying structure (50) is pointed in a launch direction. Fifth, release the cradle member (12) of the launcher (10) so that the launcher (10) and the flying structure (50) are propelled toward the stationary object (22). The nose engagement member (14) will pivot and release from the nose (50A) of the flying structure (50) when the elastic cord (18) is slackened and the tail engagement member (16) will in turn disengage from the flying structure (50) allowing the launch of the flying structure (50) to proceed in a launch direction.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A device for launching a flying structure, said flying structure having a nose and a tail end, comprising:
   a cradle member for retaining said flying structure prior to launch of said flying structure, said cradle member having a first end and a second end;
   a nose engagement member pivotably attached at said first end of said cradle member, said nose engagement member releasably engaging said nose of said flying structure prior to launch of said flying structure;
   a tail engagement member attached to said second end of said cradle member, said tail engagement member releasably engaged to said tail end of said flying structure prior to launch of said flying structure; and
   a propelling member for imparting energy to said flying structure.

2. The device of claim 1 further comprising a lateral force distribution member contoured to cooperate with said tail end of said flying structure.

3. The device of claim 1, wherein said device may be composed of composite material.

4. The device of claim 1, wherein said device may be composed of metal wire.

5. The device of claim 1, wherein said propelling member for imparting energy to said flying structure further comprises an elastic cord attached at a first end to said nose engagement member and attached to a stationary object, said cord providing motive force to propel said flying structure after said cord is stretched away from said stationary object and said cradle member is released, said nose engagement member pivotably disengaging from said nose of said flying structure after said release, said tail engagement member disengaging from said tail of said flying structure after said disengagement of said nose engagement member.

6. The device of claim 1, wherein said cradle member further comprises means for gripping said cradle prior to launching of said flying structure.

7. A combination flying structure and launcher, said flying structure having a nose and a tail end, comprising:
- a cradle member for retaining said flying structure prior to launch of said flying structure, said cradle member having a first end and a second end;
- a nose engagement member pivotably attached at said first end of said cradle member, said nose engagement member releasably engaging said nose of said flying structure prior to launch of said flying structure;
- a tail engagement member attached to said second end of said cradle member, said tail engagement member releasably engaged to said flying structure prior to launch of said flying structure; and
- a propelling member for imparting energy to said flying structure.

8. A method of launching a flying structure comprising the steps of:
- providing a flying structure, said flying structure having a nose end and a tail end;
- further providing a launcher comprising;
    - a cradle member for retaining said flying structure prior to launch of said flying structure, said cradle member having a first end and a second end;
    - a nose engagement member pivotably attached at said first end of said cradle member, said nose engagement member releasably engaging said nose of said flying structure prior to launch of said flying structure; and
    - a tail engagement member attached to said second end of said cradle member, said tail engagement member releasably engaged to said flying structure prior to launch of said flying structure and an elastic cord attached at a first end to said nose engagement member and attached at a second end to a stationary object;
- placing said flying structure upon said cradle member of said launcher such that said nose end of said flying structure engages said nose engagement member and said tail end of said flying structure engages said tail engagement member;
- pulling said cradle member of said launcher away from said stationary object such that said elastic cord is placed under tension and said nose end of said flying structure is pointed in a launch direction;
- releasing said cradle member of said launcher;
- propelling said flying structure toward said stationary object;
- pivoting said nose engagement member to disengage said nose of said flying structure;
- disengaging said tail engagement member from said tail of said flying structure thereby releasing and launching said flying structure in said launch direction.

9. The method of claim 8 wherein said tail engagement member further comprises a lateral force distribution member contoured to cooperate with said tail end of said flying structure to distribute launch forces over an extended area of said tail.

* * * * *